US012620150B2

(12) United States Patent
Wick et al.

(10) Patent No.: US 12,620,150 B2
(45) Date of Patent: May 5, 2026

(54) TEST STRIP IMAGE SYSTEM

(71) Applicant: Visual Supply Company, San Francisco, CA (US)

(72) Inventors: Samuel Peter Wick, Longmont, CO (US); Jared S. Smith, Vallejo, CA (US)

(73) Assignee: Visual Supply Company, San Francisco, CA (US)

( * ) Notice: Subject to any disclaimer, the term of this patent is extended or adjusted under 35 U.S.C. 154(b) by 129 days.

(21) Appl. No.: 18/439,649

(22) Filed: Feb. 12, 2024

(65) Prior Publication Data

US 2025/0259354 A1 Aug. 14, 2025

(51) Int. Cl.
G06T 11/60 (2006.01)
G06F 3/04845 (2022.01)
G06V 10/25 (2022.01)

(52) U.S. Cl.
CPC .......... G06T 11/60 (2013.01); G06F 3/04845 (2013.01); G06V 10/25 (2022.01)

(58) Field of Classification Search
CPC ..... G06T 11/60; G06F 3/04845; G06F 3/0482
See application file for complete search history.

(56) References Cited

U.S. PATENT DOCUMENTS

| | | | | |
|---|---|---|---|---|
| 7,593,603 B1 * | 9/2009 | Wilensky | ................. | G06T 11/60 382/311 |
| 8,051,376 B2 * | 11/2011 | Adhikari | ............. | G06F 3/04817 715/835 |
| 8,214,766 B1 * | 7/2012 | Berger | ..................... | G06T 11/60 715/822 |
| 9,024,967 B2 * | 5/2015 | Samra | ................... | G06F 3/0484 345/619 |
| 2008/0137952 A1 * | 6/2008 | Kokemohr | .............. | G06T 11/60 382/173 |
| 2012/0294589 A1 * | 11/2012 | Samra | ..................... | G11B 27/34 386/282 |
| 2013/0236093 A1 * | 9/2013 | Gatt | ....................... | G06F 3/0482 382/311 |
| 2013/0238747 A1 * | 9/2013 | Albouze | .............. | G06F 3/0482 709/217 |

FOREIGN PATENT DOCUMENTS

| | | | | | |
|---|---|---|---|---|---|
| KR | 20210020987 A | * | 2/2021 | ............. | H04N 23/73 |
| KR | 20230164069 A | * | 12/2023 | ......... | G06F 3/04845 |

* cited by examiner

*Primary Examiner* — Chante E Harrison
(74) *Attorney, Agent, or Firm* — Schwegman, Lundberg & Woessner, P.A.

(57) ABSTRACT

Systems and methods are directed to generating and utilizing digital image test strips. An image system generates and displays a user interface that includes an image and an effect editing tools portion, whereby the effect editing tools portion includes test strip options associated with at least some effects of the effect editing tools portion. A selection of a test strip option for a first effect is received via the user interface by the image system. In response to receiving the selection, the image system generates an image test strip by applying incremental values of a range of values for the first effect to different portions of the image. The user interface is updated to display the image test strip. A selection of a test strip option for a second effect can also be received and the image test strip updated to reflect incremental values of both effects applied concurrently.

20 Claims, 10 Drawing Sheets
(4 of 10 Drawing Sheet(s) Filed in Color)

TEST STRIP IMAGE SYSTEM

TECHNICAL FIELD

The subject matter disclosed herein generally relates to image processing. Specifically, the present disclosure addresses systems and methods that generate and display image test strips showing a range of values of effects applied to images.

BACKGROUND

Comparison is a powerful tool in creating/editing images (e.g., art, photographs). Because visual art inherently does not have a right or wrong answer, users partake in a subjective act in deciding what edit is best for their images. Conventionally, users may adjust effects on images when editing images. This typically involves a user viewing a before version of an image. The user then makes an adjustment to an effect such as, for example, exposure, and views an after version of the same image.

BRIEF DESCRIPTION OF THE DRAWINGS

The patent or application file contains at least one drawing executed in color. Copies of this patent or patent application publication with color drawings will be provided by the Office upon request and payment of the necessary fee.

Some implementations are illustrated by way of example and not limitation in the figures of the accompanying drawings.

DETAILED DESCRIPTION

Figure 1:
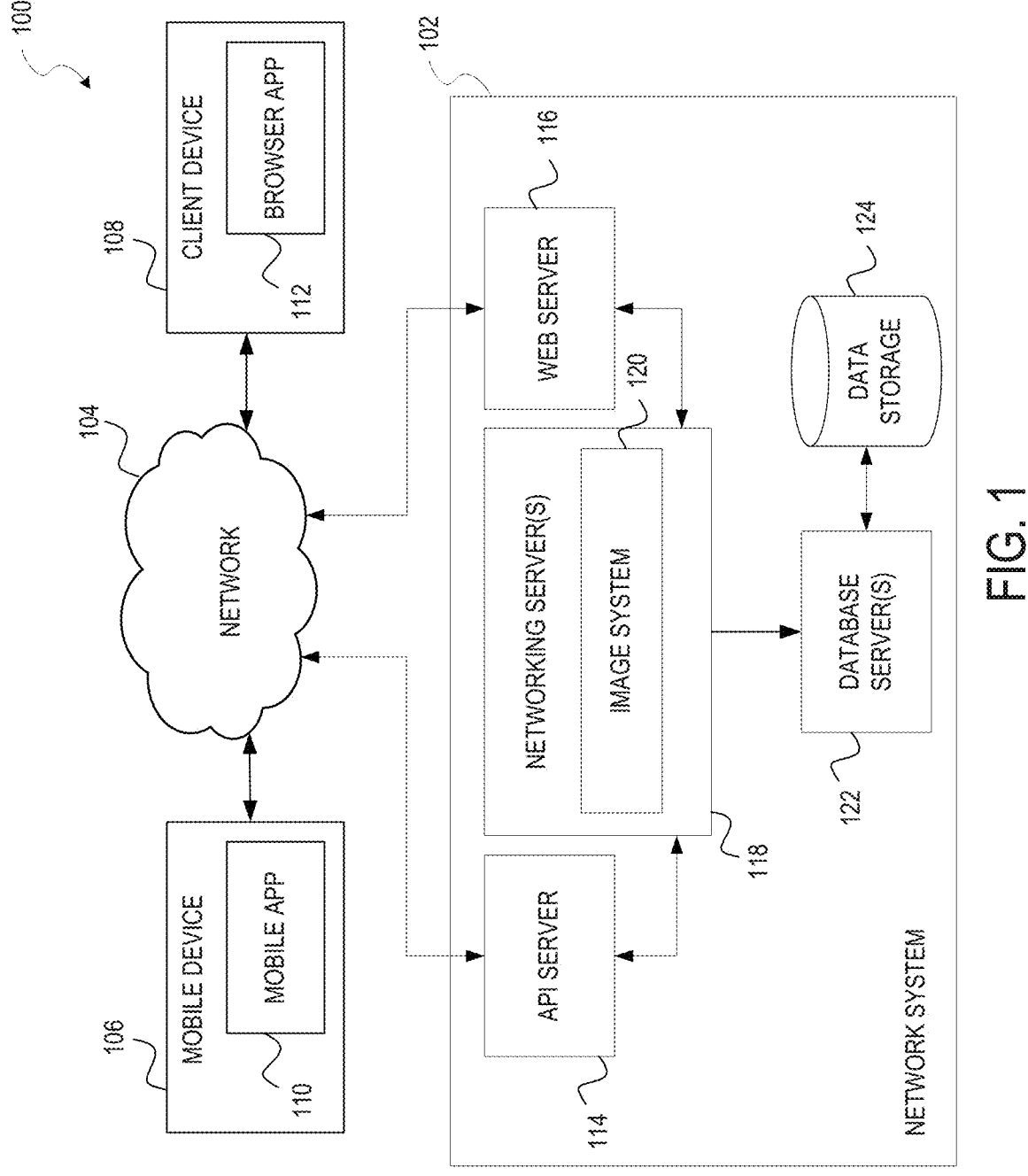
FIG. 1 is a diagram illustrating an example network environment suitable for generating, displaying, and utilizing image test strips, according to example implementations.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

Systems and methods that generate and display image test strips showing a range of values of effects applied to images are discussed herein. Comparing different edits can be a very effective technique for deciding which edit best suits a user's intent. Comparing can be achieved in several ways. A first manner it to compare an image before and after an edit is applied. The user can view both versions of the image but not at the same time. A second manner of comparison is to compare images side by side, thus enabling a user to view the versions at the same time. Example implementations use a third version of comparison by showing different versions of edits at the same time on the same image. This is similar to darkroom photo developing processes for determining correct exposure for a print.

More specifically, example implementations provide an image system that generates an image test strip that visualizes different values for an effect on the same image at the same time. The effects can be one or more of, for example, exposure, contrast, saturation, temperature, tint, skin tone, fade, and/or grain. When a test strip option is selected for an effect, the image system determines the range of values, how to increment the range, and a number of strips that should be generated for the image, whereby each strip will have a different value (e.g., increment of the range) of the effect applied thereto. The image system then generates the image test strip by applying the different values to each strip of the image. The image test strip is displayed on a user device such that a user can easily view the range of the value for the effect on the image. The various strips of the image test strip can be selected, moved, expanded, and/or applied to the entire image.

As a result, example implementations provide a technical solution to the technical problem of displaying edits to an image in a digital format that allows for easy comparison. In particular, the technical solution employs an image system that generates image test strips that display a range of values for different effects on the same image at the same time. As a result, multiple images having different values applied thereon do not need to be generated in order to compare the difference in application of different values of the effect. Additionally, a user does not need to incrementally change values multiple times before arriving at an optimal value to apply to the image as a whole. As such, one or more of the methodologies described herein may obviate a need for certain efforts or computing resources that otherwise would be involved in generating multiple versions of an image having different values of an effect applied thereon. Examples of such computing resources include processor cycles, memory usage, data storage capacity, power consumption, and network bandwidth.

FIG. 1 is a diagram illustrating an example network environment 100 suitable for generating, displaying, and utilizing image test strips, according to example implementations. A network system 102 provides server-side functionality via a communication network 104 (e.g., the Internet, wireless network, cellular network, or a Wide Area Network (WAN)) to mobile devices 106 and client devices 108. The network system 102 is configured to provide editing functionalities to various users of the mobile devices 106 and client devices 108, as will be discussed in more detail below.

In various cases, the mobile device 106 is a device associated with a user account of a user of the network system 102 that wants to edit their images using functionalities of the network system 102. The mobile device 106 may comprise, but is not limited to, a smartphone that comprises one or more mobile applications 110 that communicate with the network system 102 for added functionality. In one implementation, the mobile application 110 comprises a communication component that exchanges data with the network system 102. For example, the mobile application 110 may be a local version of an application or component of the network system 102. Alternatively, the mobile application 110 exchanges data with one or more corresponding components/applications at the network system 102. The mobile application 110 may be provided by the network system 102 and/or downloaded to the mobile device 106.

The client device 108 may comprise, but is not limited to, a tablet, laptop, multi-processor systems, microprocessor-based or programmable consumer electronics, a desktop computer, a server, or any other communication device that can access the network system 102 via a browser. The client device 108 includes a browser application 112 that exchanges data, via the network 104, with the network system 102. For example, the browser application 112 can provide data to and access data from one or more components or applications at the network system 102. Additionally or alternatively, the client device 108 can include an image application that functions similar to the mobile application 110. Collectively, the mobile device 106 and the client device 108 are referred to herein as a "user device."

In example implementations, the user device interfaces with the network system 102 via a connection with the network 104. Depending on the form of the user device, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 104 is a Wireless Fidelity (e.g., Wi-Fi, IEEE 802.11x type) connection, a Worldwide Interoperability for Microwave Access (WiMAX) connection, or another type of wireless data connection. In such an example, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

Additionally, the user device comprises a display component (not shown) to display information (e.g., in the form of user interfaces) as will be discussed in more detail below. The user device can be operated by a human user and/or a machine user.

Turning specifically to the network system 102, an application programing interface (API) server 114 and a web server 116 are coupled to and provide programmatic and web interfaces respectively to one or more networking servers 118. The networking server(s) 118 host various systems including an image system 120, which comprises a plurality of components and which can be embodied as hardware, software, firmware, or any combination thereof. The image system 120 is configured to manage the editing of images by the network system 102. In particular, the image system 120 generates and displays image test strips that presents different values of one or more effects at the same time on the same images. The image system 120 will be discussed in more detail in connection with FIG. 2 below.

The networking server(s) 118 can be, in turn, coupled to one or more database servers 122 that facilitate access to one or more storage repositories or data storage 124. The data storage 124 is a storage device storing, for example, user accounts including user profiles of users of the network system 102 and corresponding saved images of these users.

Any of the systems, data storage, or devices (collectively referred to as "components") shown in, or associated with, FIG. 1 may be, include, or otherwise be implemented in a special-purpose (e.g., specialized or otherwise non-generic) computer that can be modified (e.g., configured or programmed by software, such as one or more software components of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Functionalities of one system may, in alternative examples, be embodied in a different system. Additionally, any number of mobile devices 106, client devices 108, and data storage 124 may be embodied within the network environment 100. While only a single network system 102 is shown, alternatively, more than one network system 102 can be included (e.g., localized to a particular region).

Figure 2:
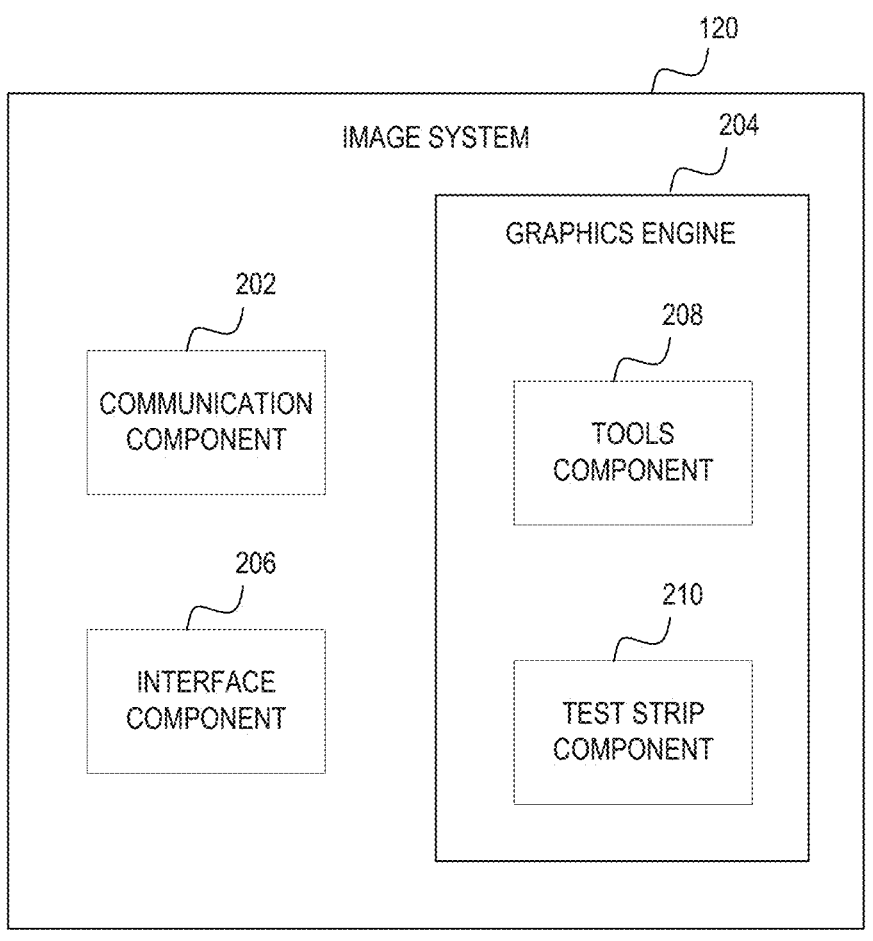
FIG. 2 is a diagram illustrating an example image system, according to example implementations.

FIG. 2 is a diagram illustrating components of the image system 120, according to example implementations. The image system 120 processes images, performs edits to the images including generating and displaying image test strips, and enables manipulations of the image test strips. To enable these operations, the image system 120 comprises a communication component 202, a graphics engine 204, and an interface component 206 all configured in communication with one another (e.g., via a bus, shared memory, or a switch). The image system 120 may comprise other components (not shown) that are not germane to the image test strip implementations.

The communication component 202 is configured to exchange data with other components of the network environment 100. Thus, the communication component 202 receives, from the mobile application 110 operating on the mobile device 106 or via the browser application 112 operating on the client device 108, a request to view and edit images. In some cases, the request includes the image to be edited. In other cases, the request indicates an image that has been previously provided (e.g., uploaded) to the network system 102 (via the communications component 202) and stored in the data storage 124. In some cases, the communication component 202 may also receive inputs that indicate operations that a user wants performed on their image. For example, the inputs can indicate to crop or rotate an image, change one or more effects applied to the image, save an edited image, and so forth.

The graphics engine 204 is configured to perform edits or modifications to images based on user inputs and generate the edited images for display. For example, the graphics engine 204 can apply one or more effects to an image, crop an image, apply filters, blur an image, etc. In some implementations, the graphics engine 204 generates image test strips. For these implementations, the graphics engine 204 includes a tools component 208 and a test strip component 210. The graphics engine 204 can include other components (not shown) that perform other types of image processing (e.g., editing and modification) not related to the image test strip implementations.

In example implementations, the tools component 208 provides effect editing tools that allow a user to adjust values of effects on an image. The effect editing tools are displayed on the user device via user interfaces generated by the interface component 206. In example implementations, the effect editing tools allow for adjustments to various effects including, for example but not limited to, exposure, contrast, saturation, temperature, tint, skin tone, fade, and/or grain. Each effect editing tool operates on a range. For example, saturation has a range that goes from only shades of gray to an extremely vivid color. Thus, the tools component 208 maintains a range of values for each effect and provides a mechanism to adjust values of a corresponding range of an effect. In implementations where a user selects to view the range at the same time on the image, the user may select a test strip option provided by the tools component 208 for one or more of the effects as will be discussed in more detail below.

The test strip component 210 generates the image test strip in response to the selection of the test strip option for one or more of the effects. In some cases, the test strip component 210 receives the values of the range for the selected effect(s) from the tools component 208. The test strip component 210 can determine, based on the range of values, how to increment the values and a number of portions or strips that should be generated for the image. The test strip component 210 then generates an image test strip that visualizes the corresponding range of values for the effect(s) in the determined increments by applying the incremental values of the range on different portions or strips of the same image. It is noted that portions and strips are used interchangeably herein and can mean the same thing (e.g., a part of an image).

In example implementations, the number of portions can be determined by the test strip component 210 (e.g., based on past number of portions used), be a default number, or be customized by a user. In one implementation, the portions are vertical (rectangular) strips on the same image. Alternative implementations can apply the different values along horizontal (rectangular) strips of the same image, as patchworks of different shapes (e.g., rectangular, square) on parts of the same image, or using some other pattern whereby different values of the effect can be applied to the same image. As a result, a range of values for an effect can be displayed at the same time on the same image. This allows a user to quickly view how the different values for an effect will look on their image.

In some cases, the test strip component 210 applies two or more different effects at the same time. For example, the user may have selected a test strip option for exposure, contrast, and saturation. The test strip component 210 combines the effects and generates what it thinks is the best range of values for the combination. For example, similar values in the ranges for exposure, contrast, and saturation (e.g., −6 to +6) can be combined (e.g., −6 value of exposure with −6 value of contrast with −6 value of saturation) and applied to each strip of the image test strip. In other examples, different combinations of values from the ranges can be combined (e.g., −2 value of exposure with 0 value of contrast with −2 value of saturation). In these examples, the different combinations can be determined by the test strip component 210 based on, for example, what is commonly applied or selected by other users. In some cases, the test strip can be displayed in a quadrant format, using horizontal strips, or using vertical strips.

In other implementations, the selection of test strip options for two effects can be displayed in a crisscross pattern. For example, the first effect can be displayed with incremental values applied along vertical strips, while the second effect can be displayed with incremental values applied along horizontal strips. This allows for the full range of both effects to be displayed and all combinations of the two effects visible at the same time.

The test strip component 210 generates the image test strip automatically upon selection or deselection of a test strip icon for an effect. Continuing with the above example having three selected effects, for example, the user can deselect the test strip icon for exposure. In response, the test strip component 210 immediately updates the image displayed on the user interface to show a combination of the values for contrast and saturation. Subsequently, the user can select the test strip icon for tint and the test strip component updates the image to show a combination of the values for contrast, saturation, and tint.

Additionally, the user can select a portion or strip corresponding to a particular value and manipulate the strip. In some cases, the user can move (e.g., dragging with a cursor or dragging with a finger on a touchscreen) a bounding box of the selected strip around to see the value of the effect applied over different parts of the image. In other cases, the user can expand the selected strip to view the value of the effect over a larger portion of the image. The various operations that a user can perform on the image using example implementations will be discussed further below.

Figure 3A:
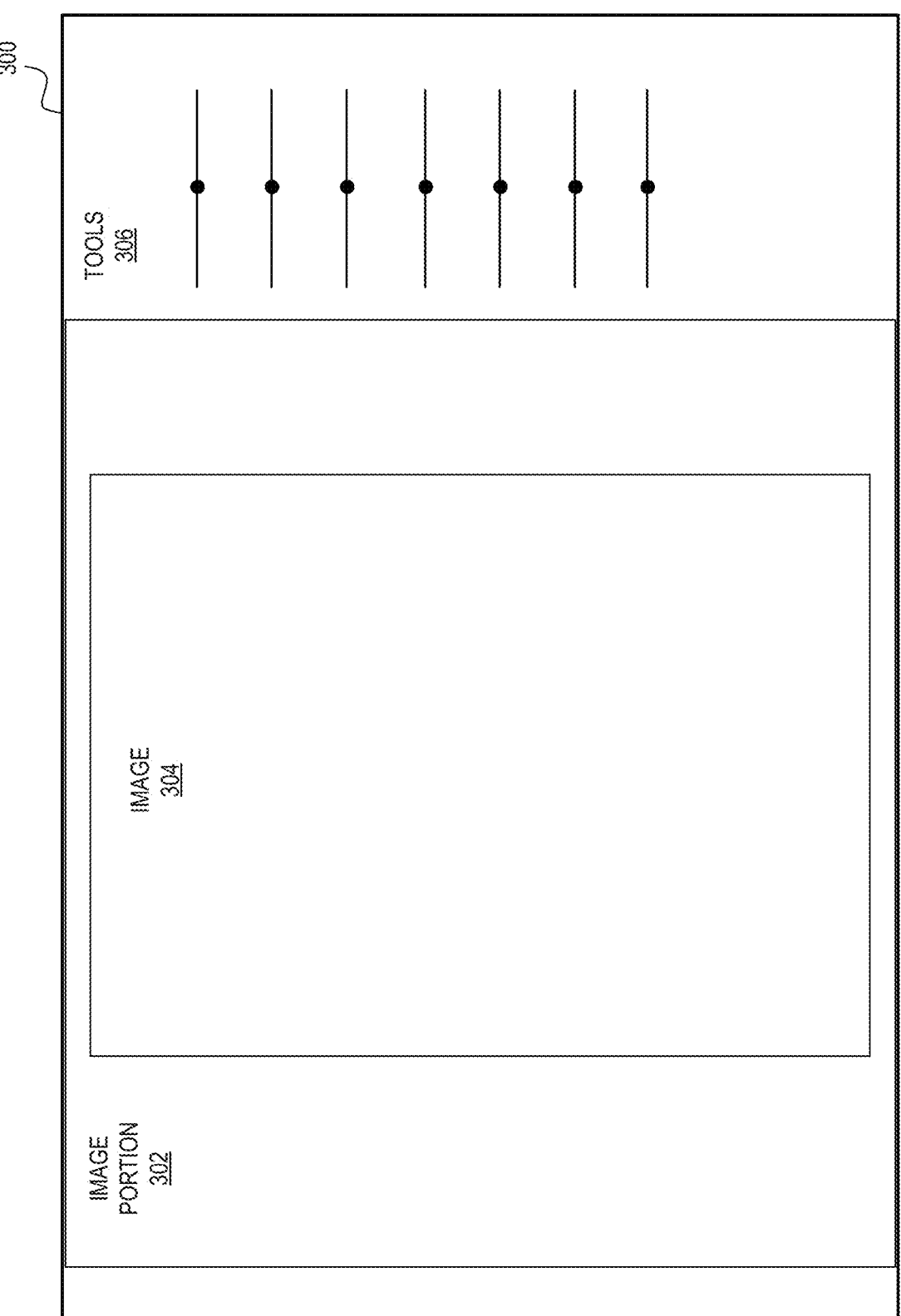
FIG. 3A is an effect edit user interface displayed on a user device for generating and displaying image test strips, according to example implementations.

FIG. 3A is an effect edit user interface 300 displayed on a user device for generating and displaying image test strips, according to example implementations. The effect edit user interface 300 is generated and displayed (or transmitted to the user device for display depending on the implementation) by the interface component 206. In one implementation, the effect edit user interface 300 is reached via a higher-level user interface (e.g., preceding webpage or screen) where the user may have selected the image to edit.

The effect edit user interface 300 comprises an image portion 302 where an image 304 to be edited is displayed and an effect editing tools portion 306. The effect editing tools portions 306 is provided and controlled by the tools component 208. Thus, if a new editing tool is embodied within the tools component 208, a corresponding editing tool is presented on the effect editing tools portion 306. A user can select or adjust one or more effects presented in the effect editing tool portion 306 to view a change in value(s) for a respective effect on the image 304.

Figure 3B:
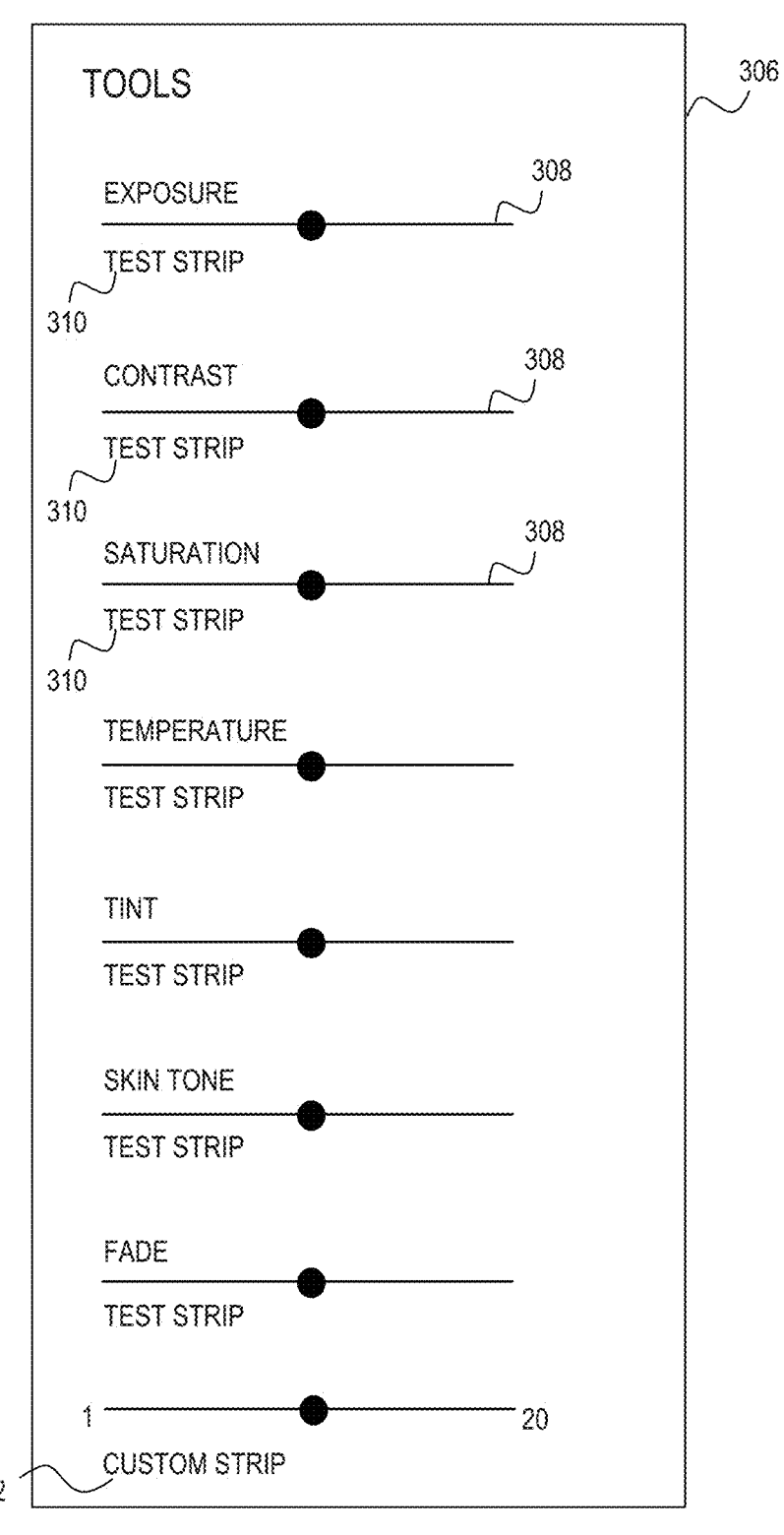
FIG. 3B illustrates a tools section of the effect edit user interface, according to example implementations.

Referring now to FIG. 3B, the effect editing tools portion 306 is shown expanded and, in more detail, in accordance with example implementations. The effect editing tools portion 306 includes editing tools for different effects including exposure, contrast, saturation, temperature, tint, skin color, and fade. It is noted that more, less, or alternative effects can be included in other implementations of the effect editing tools portion 306.

In some implementations, each effect in the effect editing tools portion 306 has an associated slider bar 308. A user can manually move a slider (e.g., shown as a circle) to adjust a value of a respective effect. For example, the user can move a slider for saturation up to make the displayed image 304 more saturated. In some cases, the slider bar 308 is bidirectional whereby the default (e.g., center of a range and slider bar 308) is at 0 and values, for example, go up to 6 or down to −6. In other cases, the slider bar 308 is unidirectional—starting, for example, at 0 and going to 12 or starting at 12 and going to 0. It is noted that other value ranges can be used for the various effects.

The effect editing tools portion 306 also provides a corresponding test strip icon or option 310 for each effect. When the test strip icon 310 for a particular effect is selected, the graphics engine 204 (e.g., test strip component 210) automatically applies incremental values for the particular effect to different portions of the image to generate the image test strip. In some example implementations, the test strip component 210 generates seven strips for the particular effect. For the above example of a bidirectional slider bar 308, the increments of the value for the particular effect are even (e.g., −6, −4, −2, 0, 2, 4, 6). Thus, the image test strip will be shown with portions or strips having values of −6, −4, −2, 0, 2, 4, 6 for the effect applied to the image. It is noted that other increments and number of strips can be used in generating the image test strip. While FIG. 3B shows a test strip icon 310 for all of the effects, some implementations may provide test strip icons for only some of the effects.

In some implementations, the number of strips in the image test strip can be customized by the user. For example, the effect editing tools portion 306 can include a custom strip slider 312. The user can change the number of strips that are generated for an image test strip by moving the custom strip slider 312 between values (e.g., between 1 and 20). In other implementations, a custom strip icon is provided instead of the custom strip slider 312. Selection of the custom strip icon can cause display of a field in which the user can enter the number of strips to use in displaying the range of values for the corresponding effect. Alternatively, selection of the custom strip icon can cause display of a drop-down menu listing different numbers of strips that can be generated. Other manners of indicating the number of strips to generate for the image test strip can be used. Thus, the user may indicate, via the custom strip slider 312 or icon, to show the range of values from, for example, −6 to +6 over two test strips or over twenty test strips.

In a further implementation, the image test strip may comprise a single strip with a smooth scale. For instance, tint can be shown from −6 to +6 gradually and smoothly changing over the horizontal or vertical length of the image.

Figure 4A:
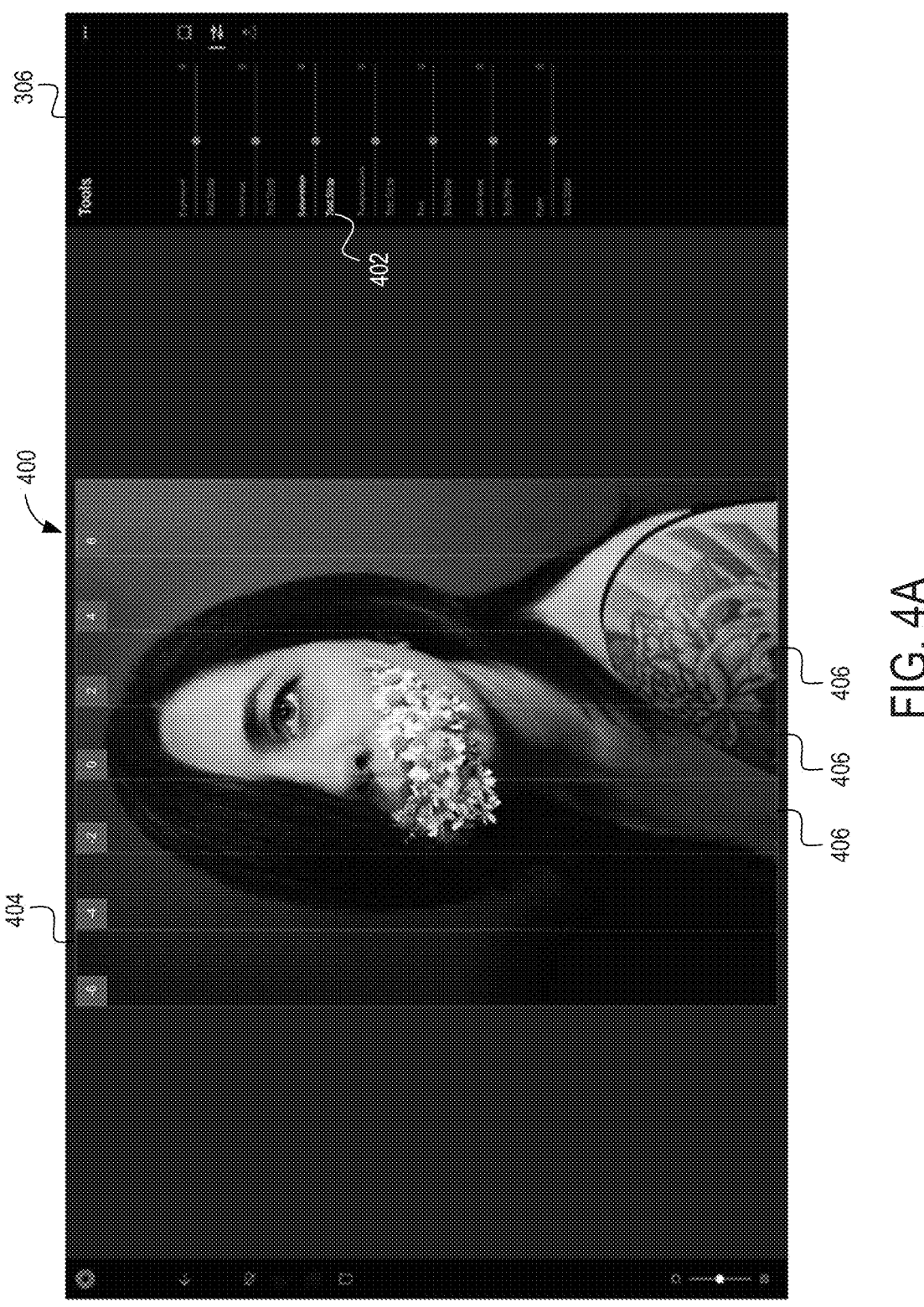
FIG. 4A-FIG. 4D illustrates an image for which an image test strip is generated and utilized, according to one example implementation.
Figure 4B:
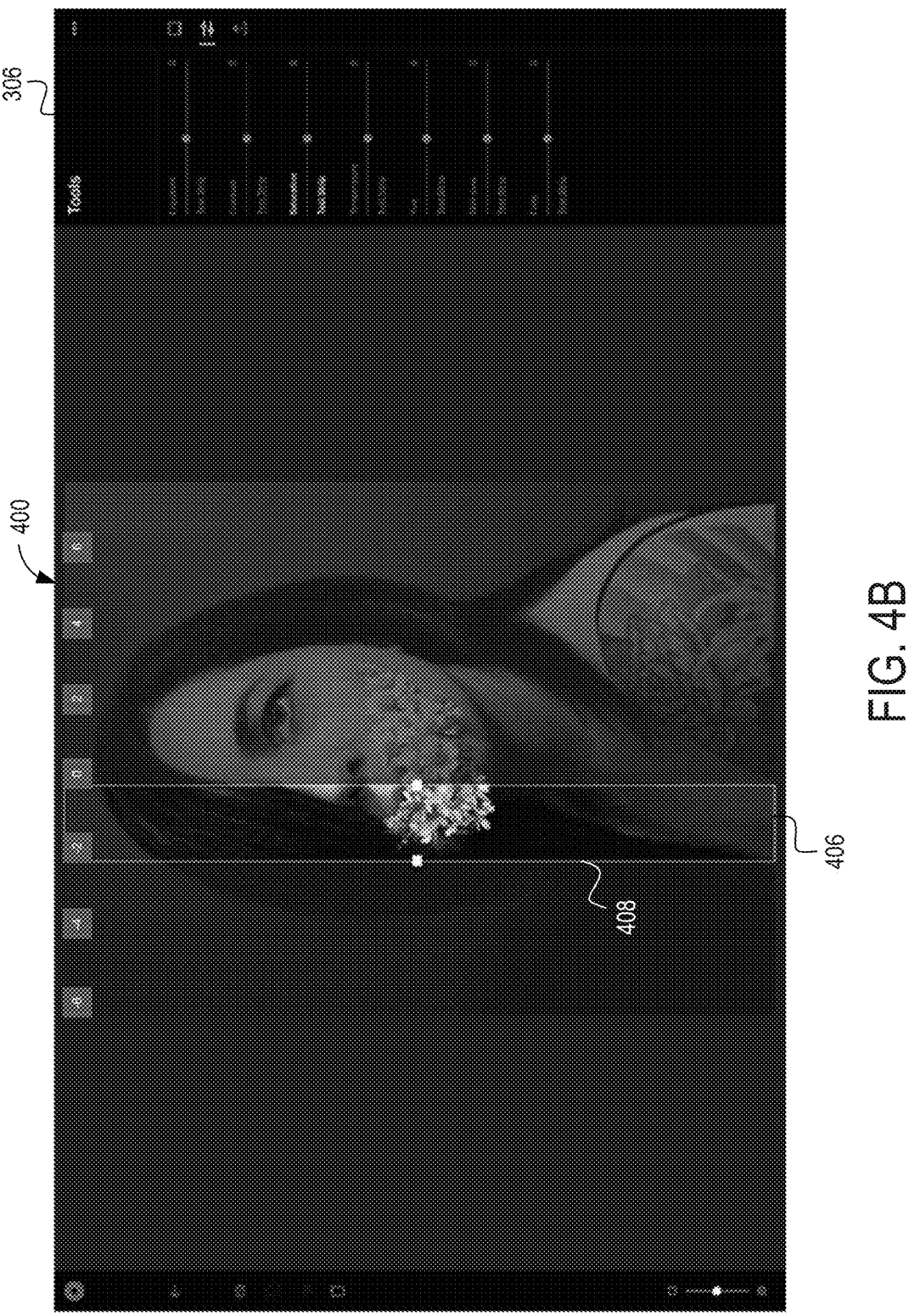
Figure 4C:
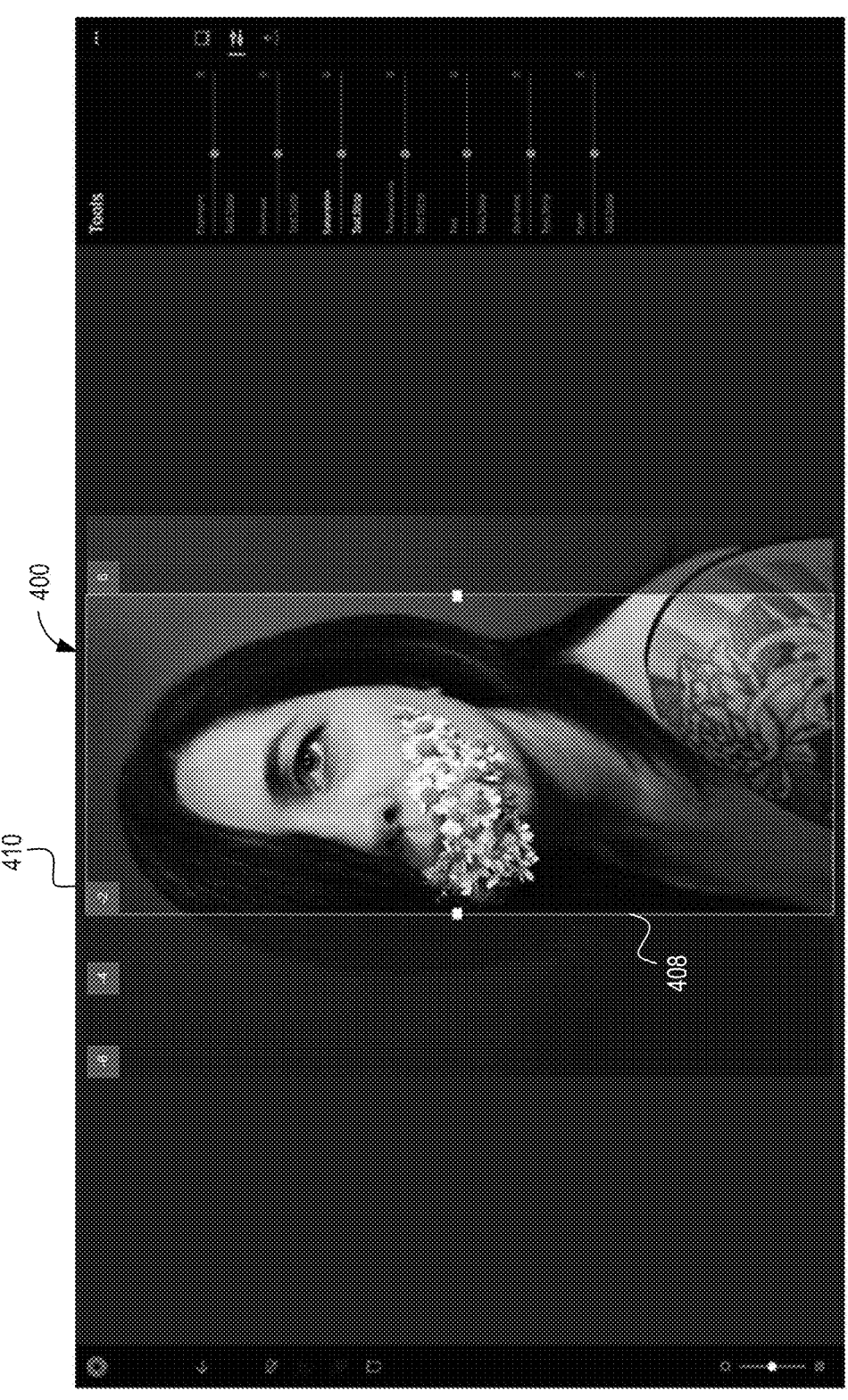

FIG. 4A-FIG. 4C illustrate a user interface displaying an image 400 for which an image test strip is generated and utilized, according to one example implementation. The example of FIG. 4A-FIG. 4C shows a single effect applied to the same image 400. However, as discussed above, more than one effect can be selected for image test strip generation and display.

Referring to FIG. 4A, the image 400 selected for editing is displayed on the user interface. To a side of the image 400 is the effect editing tools portion 306. In the example of FIG. 4A, a test strip icon 402 for saturation is selected (shown highlighted). In response to the selection, the graphics engine 204 (e.g., test strip component 210) generates an image test strip 404 that comprises a plurality of strips 406 that span a range of values for the saturation effect. As shown, the range is between −6 to +6 in intervals of two. The strips 406 of the image test strip 404 are displayed on the same image 400 to allow visual comparison of the different values of saturation on the image 400 at the same time. While the example of FIG. 4A shows the strips 406 displayed as vertical strips, alternative implementations can display the strips 406 horizontally, in a patchwork manner, or using any other pattern that allows for different portions of the image 400 to show different values of an effect applied thereon.

The user can deselect the test strip icon 402 for saturation and select a test strip icon for a different effect on the effects editing tools portion 306. Alternatively, the user can keep the test strip icon 402 for saturation selected and select one or more additional test strip icons for other effects. This results in the test strip component 210 generating strips for combinations of the values of the effects of the selected test strip icon(s).

Additionally, while the example of FIG. 4A shows seven strips 406 displayed for the image test strip 404, any number of strips may be used. In some implementations, the test strip component 210 can determine that more or less strips may better illustrate the range. For instance, if the range is from −8 to +8 for an effect, the test strip component 210 can generate nine strips that change the value in increments of two (e.g., −8, −6, −4, −2, 0, 2, 4, 6, 8).

In other implementations, the user can select a custom number of strips for display. For example, the seven strips 406 for saturation can be displayed as shown in FIG. 4A. The user may decide that more strips are needed. The user may move a custom strip slider or select a custom strip icon and indicate to generate thirteen strips (e.g., for values of −6, −5, −4, −3, −2, −1, 0, 1, 2, 3, 4, 5, 6). Alternatively, the user may select a custom strip icon and indicate, for example, that the increments should be in intervals of one-resulting in 13 strips.

Referring now to FIG. 4B, one of the strips 406 is selected. As shown, the strip 406 having a saturation value of −2 is selected. The strip 406 can be selected by clicking on any portion of the image 400 within a bounding box 408 of the strip 406. The bounding box 408 of the selected strip 406 can then be moved around the image 400 to show what the selected saturation value looks like in other parts of the image 400.

Additionally or alternatively, a size and/or shape of the bounding box 408 can be adjusted. For example and referring to FIG. 4C, the bounding box 408 has been enlarged to show the selected saturation value over a larger area of the image 400. In one implementation, a user can select a side or corner of the bounding box 408 and drag the side or corner to obtain the desired size.

For implementations that display the image test strip 404 as a single strip with a smooth scale, the user can click on an area of the image 400 having the desired value for the effect. Clicking on the area can cause a bounding box to be displayed over the selected area. The user can then move the bounding box to other areas of the image 400 or expand the bounding box to enlarge the application of the selected value for the effect.

Figure 4D:
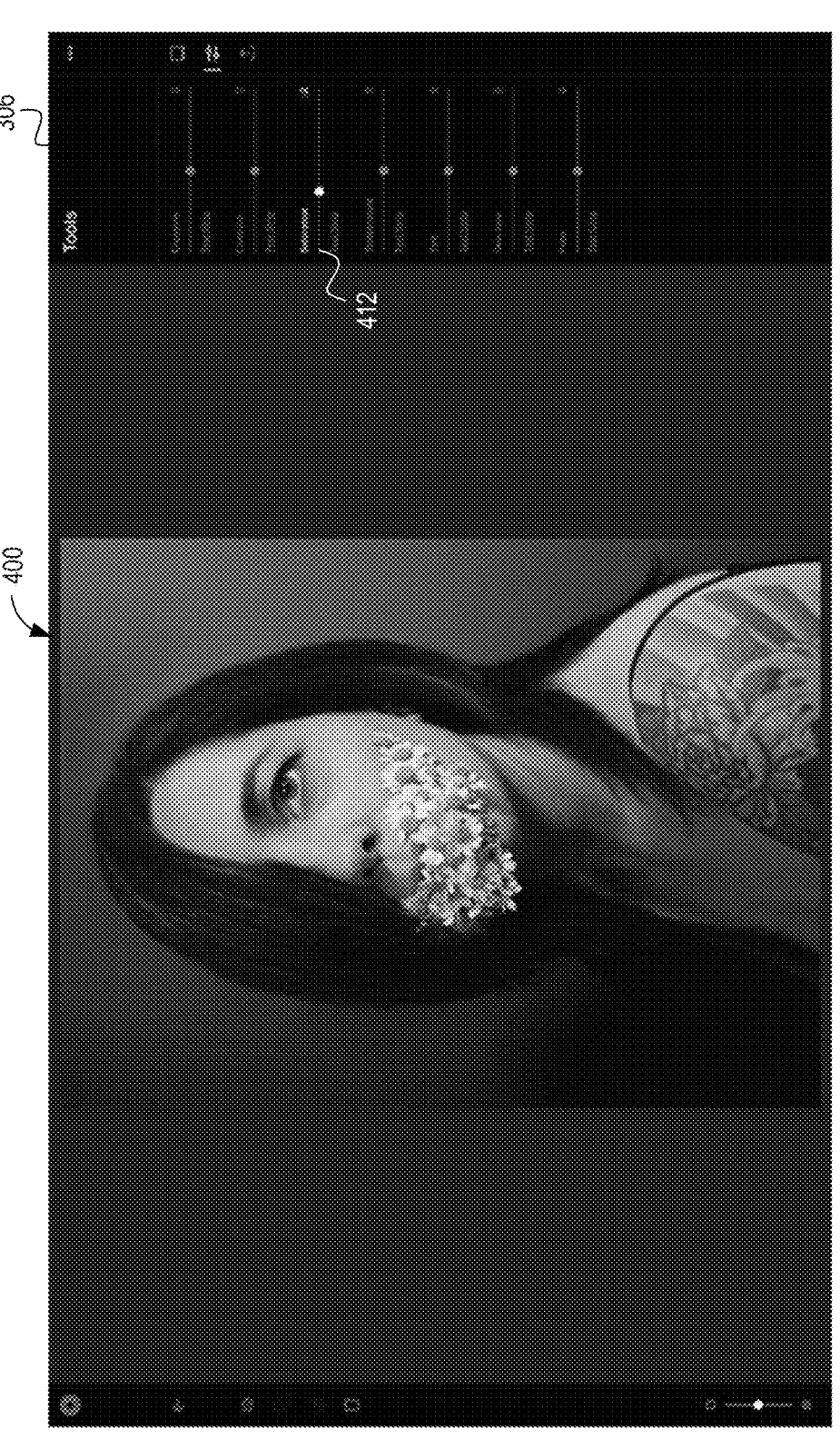

Once the user is satisfied with a value of the effect, the value of the effect can be applied to the entire image 400. In one implementation, the user may select a value indication 410 (e.g., the −2 value in the example of FIG. 4C). In response to the selection of the value indication 410, the value of the effect (e.g., saturation value of −2) is applied to the entire image 400 as shown in FIG. 4D. In the example of FIG. 4D, the saturation value is reflected on a slider bar 412 for saturation (e.g., slider on the slider bar 412 is moved to a −2 position). The user can continue to edit the image 400 using other effects available in the effect editing tools portion 306, save the image 400, or perform other operations on the image 400 (e.g., crop, rotate, print). While the example of FIG. 4C uses a selection of the value indication 410 to trigger the application of the value of the effect to the entire image 400, alternative embodiments may use a different trigger (e.g., right click selection, selection of an apply icon on the effect editing tools portion 306).

Figure 5:
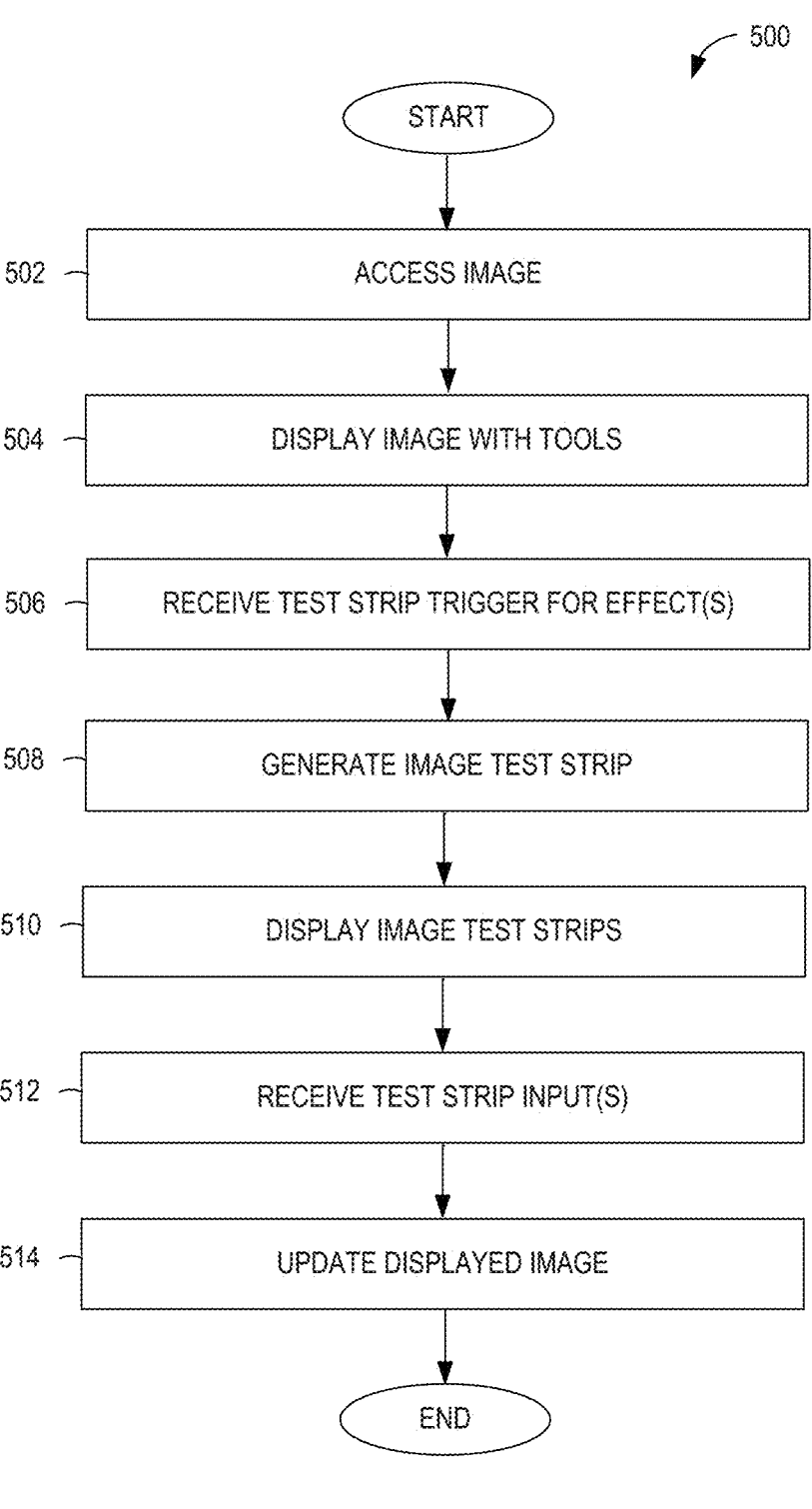
FIG. 5 is a flowchart illustrating operations of a method for generating, displaying, and utilizing image test strips, according to example implementations.

FIG. 5 is a flowchart illustrating operations of a method 500 for generating, displaying, and utilizing image test strips, according to example implementations. Operations in the method 500 may be performed by the image system 120, using components described above with respect to FIG. 2. Accordingly, the method 500 is described by way of example with reference to the image system 120. However, it shall be appreciated that at least some of the operations of the method 500 may be deployed on various other hardware configurations or be performed by similar components residing elsewhere in the network environment 100. Therefore, the method 500 is not intended to be limited to the image system 120.

In operation 502, the image system 120 accesses an image to be edited. In some cases, the communication component 202 receives a request to edit an image along with the image. In other cases, the request indicates an image that has been previously provided (e.g., uploaded) to the network system 102 (via the communications component 202) and stored in the data storage 124. In these cases, the image system 120 (e.g., the graphics engine 204) accesses the image from the data storage 124.

In operation 504, the graphics engine 204 displays the image along with effect editing tools. The effect editing tools are provided by the tools component 208 and allow for modification of the image by applying various effects such as exposure, contrast, saturation, temperature, tint, skin tone, fade, and/or grain. In example implementations, the interface component 206 generates a user interface (e.g., effect edit user interface) and causes display (e.g., transmits the user interface over the network 104 to the user device) of the user interface on the user device. The user interface can be displayed via the mobile application 110 on the mobile device 106 or via the browser application 112 on the client device 108, for example.

In operation 506, the image system 120 receive a test strip trigger for at least one of the effects. In example implementations, the effect editing tools portion of the user interface provides a test strip icon for one or more effects. The user can select the test strip icon for the effect(s) for which they want to view a range of values applied onto the image.

In operation 508, the test strip component 210 generates the image test strip. When the test strip icon for a particular effect is selected, the test strip component 210 identifies a range of values for the effect, determines increments of the values, and/or identifies a number of strips that should be generated for the image. In some implementations, the test strip component 210 determines the number of strips to create for the image test strip (e.g., based on past number of strips used). In some cases, the number of strips is customized and indicated by the user via the user interface (e.g., via a custom strip slider or icon). In other implementations, the number of strips is default (e.g., seven strips) or based on the range of values for the effect. The test strip component 210 then applies different values of the effect in the increments to different portions of the image that comprise the strips. For example, if the increments of the values for a particular effect are even (e.g., −6, −4, −2, 0, 2, 4, 6), then the image test strip will be shown with portions or strips having values of −6, −4, −2, 0, 2, 4, 6 for the effect applied to the image.

In some cases, the test strip component 210 can apply two or more selected effects at the same time. The test strip component 210 can combine the different values of the selected effects and apply the different combinations of values to the strips.

In operation 510, the interface component 206 displays the image test strip on the user interface. In particular, the test strip component 210 works with the interface component 206 to display the generated image test strip, for example, as shown in FIG. 4A. The strips of the image test strip can be shown as vertical strips, horizontal strips, in a patchwork format, in a quadrant format, or using any other pattern.

In operation 512, the image system 120 receives one or more test strip input(s) via the user interface. For example, the user can select a strip corresponding to a particular value of the effect and manipulate the strip. In some cases, the user can move a bounding box of the selected strip around to see the value of the effect applied over different parts of the image. In other cases, the user can expand the bounding box to view the effect over a larger portion of the image. The user can also deselect or select one or more effects to change combinations of effects that can be applied at the same time on the image.

In operation 514, the graphics engine 204 updates the displayed image based on the test strip input(s). In cases where the user deselects and/or selects new effects, the image test strip is updated based on new values for the selected effect(s). In cases where the user moves the selected bounding box of the selected strip or changes a size of the bounding box, the graphics engine 204 updates the displayed image accordingly. If the user indicates to save the image, the image system 120 saves the image to the data storage 124.

Figure 6:
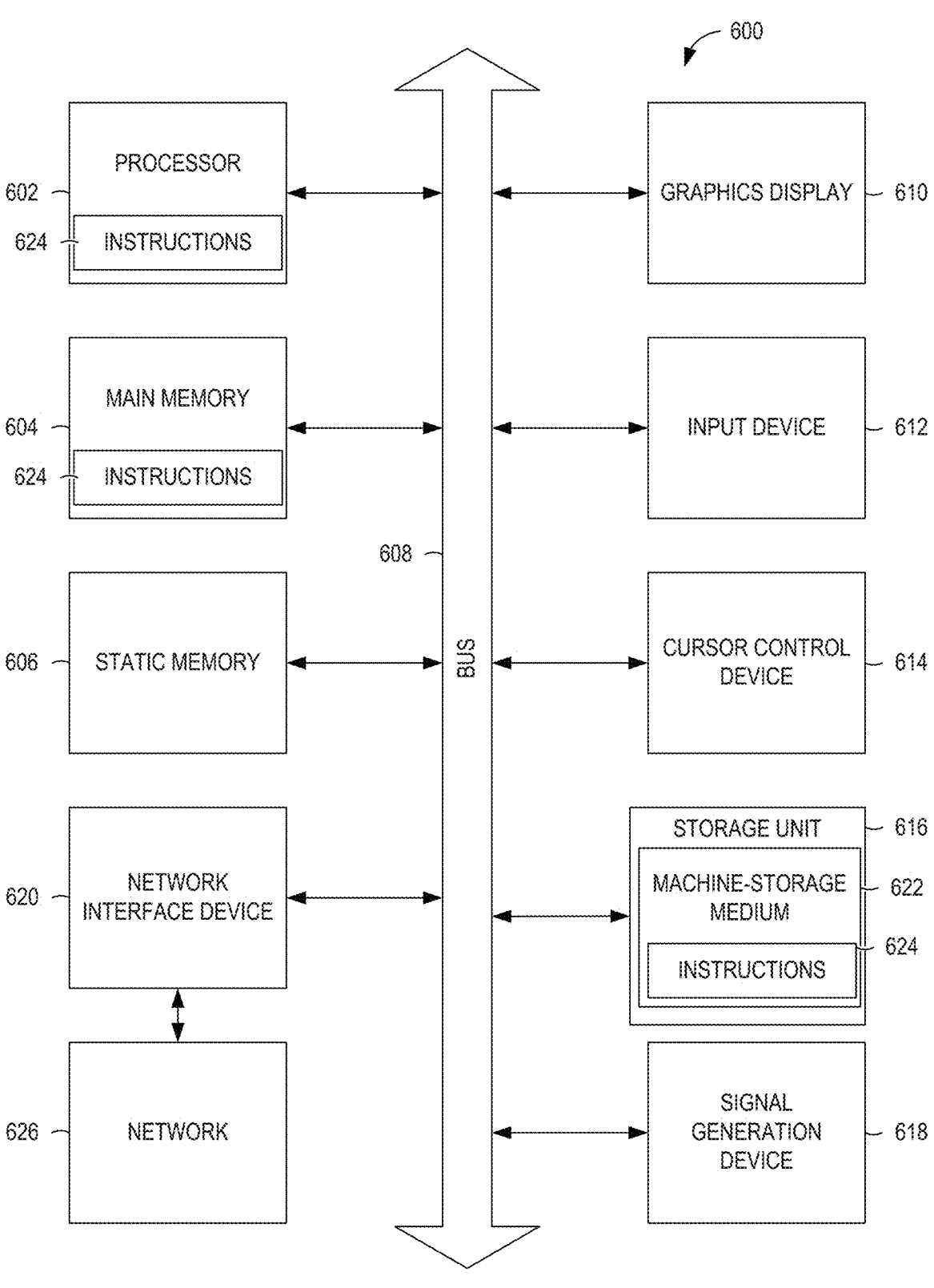
FIG. 6 is a block diagram illustrating components of a machine, according to some examples, able to read instructions from a machine-storage medium and perform any one or more of the methodologies discussed herein.

FIG. 6 illustrates components of a machine 600, according to some example implementations, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagram of FIG. 5. In one implementation, the instructions 624 can transform the machine 600 into a particular machine (e.g., specially configured machine) programmed to carry out the described and illustrated functions in the manner described.

In alternative implementations, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more components described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-storage media (e.g., tangible and non-transitory machine-storage media). The instructions 624 may be transmitted or received over a network 626 via the network interface device 620.

In some example implementations, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the components described herein.

Executable Instructions and Machine-Storage Medium

The various memories (e.g., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed implementations.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some implementations, a hardware component may be implemented mechanically, electronically, or any suitable combination thereof. For example, a hardware component may include dedicated circuitry or logic that is permanently configured to perform certain operations. For example, a hardware component may be a special-purpose processor, such as a field programmable gate array (FPGA) or an ASIC. A hardware component may also include programmable logic or circuitry that is temporarily configured by software to perform certain operations. For example, a hardware component may include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor may be configured as respectively different special-purpose processors (e.g., comprising different hardware components) at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, a processor being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example implementations, the one or more processors or processor-implemented components may be located in a single geographic location (e.g., within a home environment, an office environment, or a server farm). In other example implementations, the one or more processors or processor-implemented components may be distributed across a number of geographic locations.

EXAMPLES

Example 1 is a method for generating and utilizing digital image test strips. The method comprises accessing, by an image system embodied on a server, an image to edit; generating and causing display, by the image system, of a user interface that includes the image and an effect editing tools portion, the effect editing tools portion including test strip options associated with at least some effects of the effect editing tools portion; receiving, via the user interface by the image system, a selection of a test strip option for a first effect; in response to receiving the selection of the test strip option, generating, by the image system, an image test strip by applying incremental values of a range of values for the first effect to different portions of the image; and updating, by the image system, the user interface to display the image test strip.

In example 2, the subject matter of example 1 can optionally include receiving a selection of a portion of the image test strip have a first value of the first effect; receiving an indication to move a bounding box of the portion to a different area of the image; and in response to receiving the indication to move the bounding box, applying the first value of the first effect to the different area.

In example 3, the subject matter of any of examples 1-2 can optionally include receiving a selection of a portion of the image test strip have a first value of the first effect; receiving an indication to change a size of a bounding box of the portion; and in response to receiving the indication to change the size, resizing the bounding box and applying the first value of the first effect to an area of the image within the resized bounding box.

In example 4, the subject matter of any of examples 1-3 can optionally include receiving a selection of a portion of the image test strip have a first value of the first effect; receiving a selection of a trigger to apply the first value of the first effect to an entirety of the image; and in response to receiving the selection of the trigger, applying the first value of the first effect to an entirety of the image.

In example 5, the subject matter of any of examples 1-4 can optionally include receiving a selection of a test strip option for a second effect; and in response to receiving the selection of the test strip option for the second effect, generating, by the image system, an updated image test strip by applying incremental values of both the first effect and the second effect to the different portions of the image.

In example 6, the subject matter of any of examples 1-5 can optionally include receiving a deselection of the test strip option for one of the first effect or the second effect; and in response to receiving the deselection, generating, by the image system, a second updated image test strip by removing the incremental values for the first effect or the second effect and applying remaining incremental values to the different portions of the image.

In example 7, the subject matter of any of examples 1-6 can optionally include receiving a custom strip indication that customizes a number of portions to generate in the image test strip.

In example 8, the subject matter of any of examples 1-7 can optionally include wherein generating the image test strip comprises identifying the range of the values for the first effect; and determining the incremental values from the range.

In example 9, the subject matter of any of examples 1-8 can optionally include wherein generating the image test strip comprises, determining a number of portions to generate in the image test strip.

In example 10, the subject matter of any of examples 1-9 can optionally include wherein the different portions of the image comprises vertical strips of the image, horizontal strips of the image, or patchwork shapes of the image.

In example 11, the subject matter of any of examples 1-10 can optionally include wherein the effects comprise exposure, contrast, saturation, temperature, tint, skin tone, and fade.

In example 12, the subject matter of any of examples 1-11 can optionally include wherein the image test strip comprises a single strip with the range of values changing smoothly over a length of the image.

Example 13 is a system for generating and utilizing digital image test strips. The system comprises one or more processors and a memory storing instructions that, when executed by the one or more processors, cause the one or more processors to perform operations comprising accessing, by an image system embodied on a server, an image to edit; generating and causing display, by the image system, of a user interface that includes the image and an effect editing tools portion, the effect editing tools portion including test strip options associated with at least some effects of the effect editing tools portion; receiving, via the user interface by the image system, a selection of a test strip option for a first effect; in response to receiving the selection of the test strip option, generating, by the image system, an image test strip by applying incremental values of a range of values for the first effect to different portions of the image; and updating, by the image system, the user interface to display the image test strip.

In example 14, the subject matter of example 13 can optionally include wherein the operations further comprise receiving a selection of a portion of the image test strip have a first value of the first effect; receiving an indication to move a bounding box of the portion to a different area of the image; and in response to receiving the indication to move the bounding box, applying the first value of the first effect to the different area.

In example 15, the subject matter of any of examples 13-14 can optionally include wherein the operations further comprise receiving a selection of a portion of the image test strip have a first value of the first effect; receiving an indication to change a size of a bounding box of the portion; and in response to receiving the indication to change the size, resizing the bounding box and applying the first value of the first effect to an area of the image within the resized bounding box.

In example 16, the subject matter of any of examples 13-15 can optionally include wherein the operations further comprise receiving a selection of a portion of the image test strip have a first value of the first effect; receiving a selection of a trigger to apply the first value of the first effect to an entirety of the image; and in response to receiving the selection of the trigger, applying the first value of the first effect to an entirety of the image.

In example 17, the subject matter of any of examples 13-16 can optionally include wherein the operations further comprise receiving a selection of a test strip option for a second effect; and in response to receiving the selection of the test strip option for the second effect, generating, by the image system, an updated image test strip by applying incremental values of both the first effect and the second effect to the different portions of the image.

In example 18, the subject matter of any of examples 13-17 can optionally include wherein the operations further comprise receiving a custom strip indication that customizes a number of portions to generate in the image test strip.

In example 19, the subject matter of any of examples 13-18 can optionally include wherein the image test strip comprises a single strip with the range of values changing smoothly over a length of the image.

Example 20 is a computer-storage medium comprising instructions which, when executed by one or more processors of a machine, cause the machine to perform operations for generating and utilizing digital image test strips. The operations comprise accessing, by an image system embodied on a server, an image to edit; generating and causing display, by the image system, of a user interface that includes the image and an effect editing tools portion, the effect editing tools portion including test strip options associated with at least some effects of the effect editing tools portion; receiving, via the user interface by the image system, a selection of a test strip option for a first effect; in response to receiving the selection of the test strip option, generating, by the image system, an image test strip by applying incremental values of a range of values for the first effect to different portions of the image; and updating, by the image system, the user interface to display the image test strip.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes may be made to these examples without departing from the broader scope of examples of the present invention. For instance, various examples or features thereof may be mixed and matched or made optional by a person of ordinary skill in the art. Such examples of the present subject matter may be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present invention as represented by the appended claims. The specification and drawings are, accordingly, to be regarded in an illustrative rather than a restrictive sense.

What is claimed is:

1. A method comprising:

accessing, by an image system embodied on a server, an image to edit;

generating and causing display, by the image system, of a user interface that includes the image and an effect editing tools portion, the effect editing tools portion including test strip options associated with at least some effects of the effect editing tools portion;

receiving, via the user interface by the image system, a selection of a test strip option for a first effect;

in response to receiving the selection of the test strip option, automatically generating, by the image system, an image test strip for the image comprising a plurality of strips, each of the plurality of strips visually representing a portion of the image with a different incremental value of a range of values for the first effect applied thereto, each incremental value being assigned to a strip in a predetermined order such that adjacent strips of the image test strip correspond to adjacent incremental values of the range; and updating, by the image system, the user interface to display the image test strip with the plurality of strips concurrently displayed such that a user can visually compare the different incremental values of the first effect on the image.

2. The method of claim 1, further comprising:

receiving a selection of a strip of the image test strip have a first value of the first effect;

receiving an indication to move a bounding box of the strip to a different area of the image; and in response to receiving the indication to move the bounding box, applying the first value of the first effect to the different area.

3. The method of claim 1, further comprising:

receiving a selection of a strip of the image test strip have a first value of the first effect;

receiving an indication to change a size of a bounding box of the strip; and in response to receiving the indication to change the size, resizing the bounding box and applying the first value of the first effect to an area of the image within the resized bounding box.

4. The method of claim 1, further comprising:

receiving a selection of a strip of the image test strip have a first value of the first effect;

receiving a selection of a trigger to apply the first value of the first effect to an entirety of the image; and in response to receiving the selection of the trigger, applying the first value of the first effect to an entirety of the image.

5. The method of claim 1, further comprising:

receiving a selection of a test strip option for a second effect; and in response to receiving the selection of the test strip option for the second effect, generating, by the image system, an updated image test strip by applying, to each of the plurality of strips, a unique combination of incremental values of both the first effect and the second effect, such that the plurality of strips are displayed concurrently for user comparison.

6. The method of claim 5, further comprising:

receiving a deselection of the test strip option for one of the first effect or the second effect; and in response to receiving the deselection, generating, by the image system, a second updated image test strip by removing the incremental values for the deselected first effect or the deselected second effect and applying remaining incremental values to each of the plurality of strips of the image test strips at the same time.

7. The method of claim 1, further comprising:

receiving, via the effect editing tools portion, a custom strip indication from a user that indicates a number of strips to generate in the image test strip.

8. The method of claim 1, wherein generating the image test strip comprises:

identifying the range of the values for the first effect; and determining the incremental values from the range to be applied incrementally to the plurality of strips.

9. The method of claim 1, wherein generating the image test strip comprises, determining a number of strips to generate in the image test strip at the same time.

10. The method of claim 1, wherein the plurality of strips comprises a plurality of vertical strips of the image, a plurality of horizontal strips of the image, or a plurality of patchwork shapes of the image.

11. The method of claim 1, wherein the effects comprise exposure, contrast, saturation, temperature, tint, skin tone, and fade.

12. The method of claim 1, wherein the image test strip comprises the range of values for the first effect changing smoothly over a length of the image.

13. A system comprising:

one or more processors; and a memory storing instructions that, when executed by the one or more processors, cause the one or more processors to perform operations comprising:

accessing, by an image system embodied on a server, an image to edit;

generating and causing display, by the image system, of a user interface that includes the image and an effect editing tools portion, the effect editing tools portion including test strip options associated with at least some effects of the effect editing tools portion;

receiving, via the user interface by the image system, a selection of a test strip option for a first effect;

in response to receiving the selection of the test strip option, automatically generating, by the image system, an image test strip for the image comprising a plurality of strips, each of the plurality of strips visually representing a portion of the image with a different incremental value of a range of values for the first effect applied thereto, each incremental value being assigned to a strip in a predetermined order such that adjacent strips of the image test strip correspond to adjacent incremental values of the range; and updating, by the image system, the user interface to display the image test strip with the plurality of strips concurrently displayed such that a user can visually compare the different incremental values of the first effect on the image.

14. The system of claim 13, wherein the operations further comprise:

receiving a selection of a strip of the image test strip have a first value of the first effect;

receiving an indication to move a bounding box of the strip to a different area of the image; and in response to receiving the indication to move the bounding box, applying the first value of the first effect to the different area.

15. The system of claim 13, wherein the operations further comprise:

receiving a selection of a strip of the image test strip have a first value of the first effect;

receiving an indication to change a size of a bounding box of the strip; and in response to receiving the indication to change the size, resizing the bounding box and applying the first value of the first effect to an area of the image within the resized bounding box.

16. The system of claim 13, wherein the operations further comprise:

receiving a selection of a strip of the image test strip have a first value of the first effect;

receiving a selection of a trigger to apply the first value of the first effect to an entirety of the image; and in response to receiving the selection of the trigger, applying the first value of the first effect to an entirety of the image.

17. The system of claim 13, wherein the operations further comprise:

receiving a selection of a test strip option for a second effect; and in response to receiving the selection of the test strip option for the second effect, generating, by the image system, an updated image test strip by applying, to each of the plurality of strips, a unique combination of incremental values of both the first effect and the second effect, such that the plurality of strips are displayed concurrently for user comparison.

18. The system of claim 13, wherein the operations further comprise:

receiving, via the effect editing tools portion, a custom strip indication from a user that indicates a number of strips to generate in the image test strip.

19. The system of claim 13, wherein the image test strip comprises the range of values for the first effect changing smoothly over a length of the image.

20. A machine-storage medium comprising instructions which, when executed by one or more processors of a machine, cause the machine to perform operations comprising:

accessing, by an image system embodied on a server, an image to edit;

generating and causing display, by the image system, of a user interface that includes the image and an effect editing tools portion, the effect editing tools portion including test strip options associated with at least some effects of the effect editing tools portion;

receiving, via the user interface by the image system, a selection of a test strip option for a first effect;

in response to receiving the selection of the test strip option, automatically generating, by the image system, an image test strip for the image comprising a plurality of strips, each of the plurality of strips visually representing a portion of the image with a different incremental value of a range of values for the first effect applied thereto, each incremental value being assigned to a strip in a predetermined order such that adjacent strips of the image test strip correspond to adjacent incremental values of the range; and updating, by the image system, the user interface to display the image test strip with the plurality of strips concurrently displayed such that a user can visually compare the different incremental values of the first effect on the image.

\* \* \* \* \*